W. S. AUSTIN.
SPRING SUSPENSION FOR MOTOR VEHICLES.
APPLICATION FILED MAY 10, 1916.

1,291,357.

Patented Jan. 14, 1919.

Inventor
Walter S. Austin
By Moulton & Lurrance
Attorneys.

UNITED STATES PATENT OFFICE.

WALTER S. AUSTIN, OF GRAND RAPIDS, MICHIGAN.

SPRING SUSPENSION FOR MOTOR-VEHICLES.

1,291,357.          Specification of Letters Patent.          Patented Jan. 14, 1919.

Application filed May 10, 1916. Serial No. 96,718.

*To all whom it may concern:*

Be it known that I, WALTER S. AUSTIN, a citizen of the United States of America, residing at Grand Rapids, in the county of Kent and State of Michigan, have invented certain new and useful Improvements in Spring Suspensions for Motor-Vehicles; and I do hereby declare the following to be a full, clear, and exact description of the invention, such as will enable others skilled in the art to which it appertains to make and use the same.

My invention relates to a spring suspension for vehicles especially automobiles. It is an object and purpose of the present invention to provide a device of this character which, while it makes possible easier riding in automobiles, at the same time eliminates side sway of the body and permits doing away with torsion rods or the like in the vehicle. Furthermore a construction is provided in which a double spring is used at each side of the vehicle body so that should one of the springs become broken or otherwise useless the vehicle can still be operated by exercising proper care; where with one single spring its breakage would serve to make operation of the vehicle practically impossible. Many other objects and purposes than those enumerated together with novel constructions for attaining the same will appear as understanding is had of the embodiment of my invention shown in the accompanying drawing in which;

Like reference characters refer to like parts in the several views of the drawing.

Figure 1:
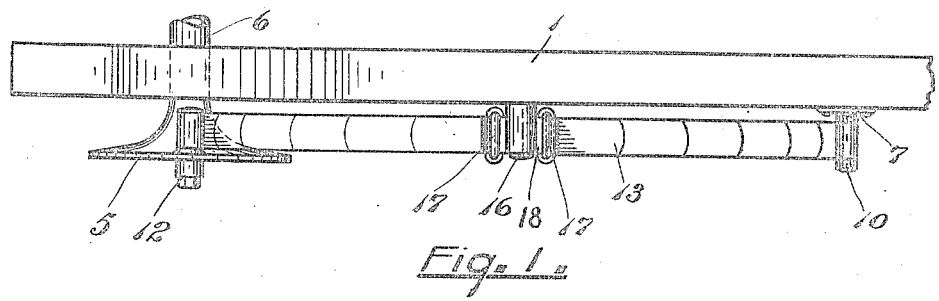
Figure 1 is a fragmentary plan view showing the connections of the springs to the frame and brake flange of the vehicle.
Figure 2:
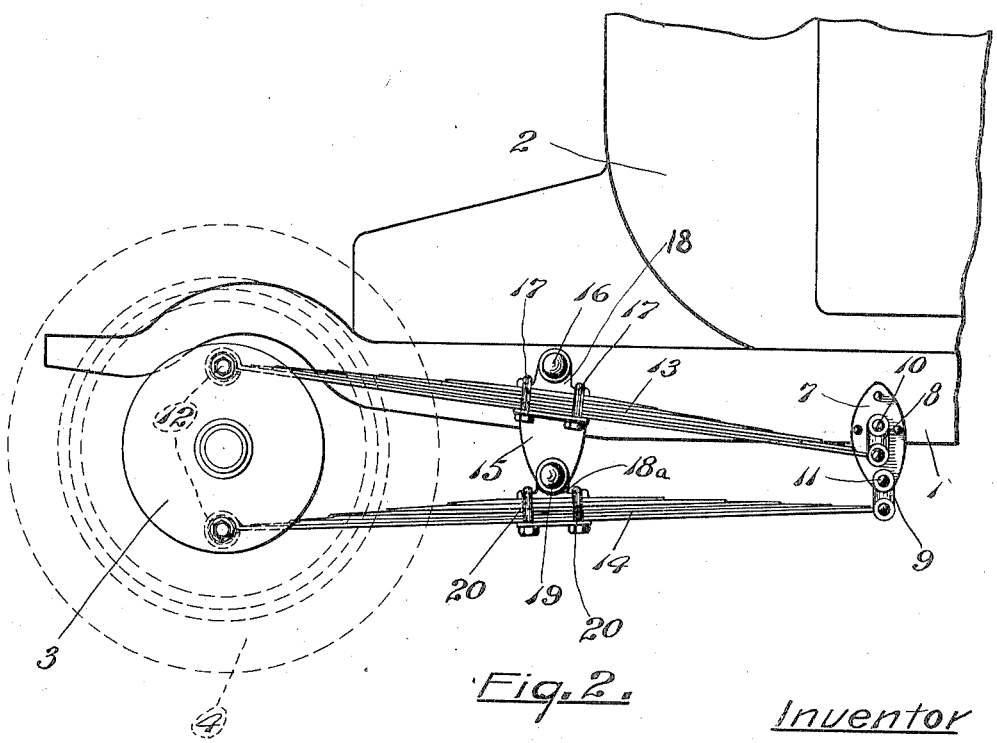
Fig. 2 is a side view of the rear part of an automobile equipped with my invention, the wheel thereof being shown in dotted lines.

The side frame members of the automobile indicated at 1 support the vehicle in the usual manner, the wheels each having a brake drum 3 housing a brake flange 5 at the ends of the axle housing 6. This is a common construction in automobiles and forms no part of the present invention, such parts being shown merely to indicate the manner in which my spring suspension is applied thereto.

The plate 7 is fixed to each frame member and projects below the lower edge of said frame member serving as a support for links 8 and 9 pivotally mounted on and suspended from outwardly projecting studs 10 and 11 respectively. At substantially diametrically opposed points above and below the axle housing 6 studs 12 project inwardly from the brake flange 5. Upward and lower leaf springs 13 and 14 are interposed between the upper and lower studs 12 and the lower ends of links 8 and 9 respectively, the rear ends of these springs being secured to the studs 12 while the forward ends of the springs are attached to pins at the lower ends of links 8 and 9.

Substantially midway between the ends of springs 13 and 14 a plate 15 is positioned and is rigidly attached to the side frame member 1. A pin 16 projects from the frame member at the upper end of plate 15, the spring 13 passing a short distance below said pin and having a pivotal connection thereto through connection by clips 17 to a member 18 pivotally suspended from said pin 16. A member 18ª is pivotally suspended on a pin 19 projecting outwardly from the lower end of plate 15 and the spring 14 is connected at its middle to the member 18 by clips 20 as shown.

A spring suspension of the character described is of advantage in many particulars. By reason of the connection of the springs at their centers to the pivotally suspended members 18 and 18ª a great degree of flexibility in the spring action is obtained which permits service of the springs under the many various conditions met in automobile driving without the development of undue strains present in springs heretofore made. Furthermore by reason of the construction outlined, when the springs are depressed centrally under a load applied to the body the lengthening of the springs causes a forward pivotal movement of the links 8 and 9 and at the same time movement of less extent of members 18 and 18ª about the pins 16 and 19, thus making in effect a double spring of twice the width of a single spring 13 or 14 with the consequent greater flexibility coupled with necessary strength which is not so with a single spring having the same strength as the two springs 13 and 14 but of greater thickness than either. There, also, is a difference in movement of the two springs whereby the rebound of the springs is in a measure counteracted thus serving to eliminate sharp shocks ordinarily present in automobile driving. Furthermore as before stated this construction of spring suspension eliminates side sway of the body and permits doing away with torsion rods or the like in the vehicle; and practically insures against any breakage so far as the spring suspension is concerned that will place the vehicle in such condition that it cannot be run at all, by reason of the fact that there are four springs, two on each side of the chassis frame, the breakage of any one of which still leaves three springs in service to carry the body and resist the tendency of the rear axle housing to turn. The divergence of the springs at their rear and their approach toward each other at their front ends makes a particularly effective torsion resisting construction and the attachment of the springs at their centers to the chassis frame in effect, eliminates, to a great measure, the objectionable endwise movement between the axle and the body of the vehicle.

I claim:

1. In a spring suspension for motor vehicles, the combination with a side frame member, rear axle housing and brake flange, of a plate secured to said frame member, an upper leaf spring pivotally secured between its ends to the plate, a member pivotally suspended from the plate, a lower leaf spring connected between its ends to the member, studs on the brake flange above and below the rear axle housing to which the rear ends of the upper and lower springs are respectively connected, a second plate secured to the frame member in front of said first plate, and upper and lower links pivotally supported on said plate to which the forward ends of the upper and lower springs are respectively connected.

2. In a spring suspension for motor vehicles, the combination with a chassis frame, rear axle housing and brake flange, of a stud projecting from the frame, a plate connected to and suspended from the frame below the stud, a stud projecting from the lower end of the plate, a member pivotally suspend from each stud, upper and lower leaf springs secured between their ends to said members below the said studs, upper and lower studs projecting from the brake flange to which the rear ends of the upper and lower leaf springs are respectively connected, a second plate fixed to the frame in front of said first plate, upper and lower pins projecting from said last plate, and links pivotally suspended from the pins, to the lower ends of which the forward ends of the upper and lower leaf springs are respectively connected, said springs diverging rearwardly from their points of connection to said links.

3. In a spring suspension for motor vehicles, the combination with a side frame member, rear axle housing and brake flange, of upper and lower leaf springs connected at their rear ends to the brake flange at substantially diametrically opposed points above and below the rear axle housing, a plate permanently attached to the frame member adjacent the forward ends of said springs, link connections between the forward ends of the springs and the plate, said springs diverging rearwardly, a second plate mounted on the frame member back of the first plate, means for pivotally connecting one spring between its ends to said side frame member, and means for pivotally connecting the other spring between its ends to said second plate.

4. In a spring suspension for motor vehicles, the combination with a side frame member, rear axle housing and brake flange, of upper and lower leaf springs connected at their rear ends to the brake flange at substantially diametrically opposed points above and below the axle housing and adjacent the edges of said flange whereby said rear ends of the springs are separated a comparatively wide distance, means for movably suspending the forward ends of the springs on the frame with said ends separated a shorter distance than the rear ends of said springs, a plate rigidly connected to the frame between the ends of the springs, pivotal connections between the upper spring at a point between its ends and said frame member, a member pivotally suspended from the lower end of the plate and connections between said member and the lower spring.

5. In a spring suspension for motor vehicles, the combination with a side frame member, rear axle housing and brake flange, of upper and lower leaf springs connected at their rear ends to said brake flange above and below the axle housing, respectively, a plate fixedly secured to the frame member adjacent the front ends of said springs, link connections between said plates and the front ends of the springs, a plate secured to the frame between the ends of the springs, a pivotal connection between said frame member and the upper spring, and a pivotal connection between the plate and the lower spring.

6. In a motor vehicle, a frame member, and brake flange, a spring pivotally connected between its ends to the frame member, a plate connected to the frame member, a second spring pivotally suspended between its ends from said plate, separate pivotal connections between the front ends of the springs and the frame member, and connections between the rear ends of said springs and the brake flange, said connections being adjacent the periphery of the brake flange whereby the rear ends of the springs are widely separated compared to the distance between the front ends of said springs.

7. In a motor vehicle, having a side frame member and brake flange, upper and lower springs connected at their rear ends to the brake flange adjacent the periphery thereof, and at their front ends to the frame member;

a plate connected to the frame member between the ends of the upper spring, means pivotally securing said upper spring to the frame member at a point between the ends of said spring, and means similarly pivotally connecting the lower spring to the plate.

8. In a motor vehicle, a brake flange and chassis frame member, upper and lower leaf springs having movable suspended connection at their front ends to the frame member and fixed connections at their rear ends to the brake flange adjacent the periphery thereof, means for pivotally securing the upper spring between its ends to the frame member, and means for pivotally connecting the lower spring between its ends to said frame member.

9. In a motor vehicle, a chassis frame member, rear axle and a brake flange, upper and lower springs located alongside the frame member and fixedly connected at their rear ends to the brake flange at points above and below the axle, and at their front ends having movable suspended connections to the frame member, said springs diverging from front to rear, and means for separately pivotally connecting each spring between its ends to the frame member.

In testimony whereof I affix my signature.

WALTER S. AUSTIN.